United States Patent [19]

Chiba et al.

[11] Patent Number: 5,034,243

[45] Date of Patent: Jul. 23, 1991

[54] METHOD FOR MAGNETIC ORIENTATION OF MAGNETIC RECORDING MEDIUM USING MEISSNER EFFECT OF HIGH TC SUPERCONDUCTOR

[75] Inventors: Katsuyoshi Chiba, Hachioji; Masayuki Katsumoto, Kodaira; Yasutaro Uesaka, Kokubunji; Heigo Ishihara, Tokyo; Naoki Kodama, Tachikawa; Hajime Fukke, Tama; Iwao Matsuyama, Sagamihara; Tsuneo Suganuma, Tokorozawa, all of Japan

[73] Assignee: Hitachi, Ltd., Tokyo, Japan

[21] Appl. No.: 430,167

[22] Filed: Nov. 1, 1989

[30] Foreign Application Priority Data

Nov. 4, 1988 [JP] Japan .................. 63-277298

[51] Int. Cl.⁵ ............... H01F 10/00; B05D 5/12
[52] U.S. Cl. ..................... 427/48; 427/130; 427/128; 427/47; 505/1
[58] Field of Search ............ 427/48, 130, 62, 47, 427/128; 428/928, 694, 900; 505/1

[56] References Cited

U.S. PATENT DOCUMENTS 4,189,508 2/1980 Chiba et al. ............... 427/48
4,508,752 4/1985 Takei et al. ................ 427/48
4,745,001 5/1988 Miyoshi et al. ............. 427/48
4,822,634 4/1989 Takahashi et al. .......... 427/48

FOREIGN PATENT DOCUMENTS 62-50888 1/1983 Japan .
62-24430 2/1987 Japan .

OTHER PUBLICATIONS

Patent Abstracts of Japan, vol. 6, No. 217, Oct. 30, 1982, JP-A-57-120221.
Moon et al., "Superconductivity: As Temperatures Rise, So Do Demands on MEs", Mechanical Engineering, Jun. 1988, pp. 60–68.

Primary Examiner—Michael Lusignan
Assistant Examiner—Roy V. King
Attorney, Agent, or Firm—Kenyon & Kenyon

[57] ABSTRACT

A method for magnetic orientation of a magnetic recording medium using Meissner effect of a superconductor and a system therefor and a magnetic recording medium produced thereby. The magnetic particles of plate hexagonal barium ferrite in the magnetic coating are allowed to orient in the longitudinal direction thereof so that a magnetic recording medium having a magnetic orientation in such direction with the magnetic particles can be obtained.

6 Claims, 3 Drawing Sheets

METHOD FOR MAGNETIC ORIENTATION OF MAGNETIC RECORDING MEDIUM USING MEISSNER EFFECT OF HIGH TC SUPERCONDUCTOR

BACKGROUND OF THE INVENTION

1. Field of the Invention

The present invention relates to a method for magnetic orientation of magnetic recording media such a magnetic disk, a magnetic tape and the like, and a system for such magnetic orientation, and more particularly, to a method for magnetic orientation of magnetic recording media which are suitable for high density recording and a system therefor and an inside magnetic recording medium.

2. Description of the Related Art

Prior techniques for magnetic orientation of high density magnetic recording mediums include disposing a plurality of electromagnets or permanent magnets both above and below the magnetic recording medium, as described, for example, in U.S. Pat. No. 4,189,508, Japanese Patent Kokai (Laid-open) No. 62-24430 and Japanese Patent Kokoku (Post-Exam. Publn.) No. 62-50888. Strict control of the relative positions of a plurality of magnets and the distances between the magnets and the magnetic recording medium (U.S. Pat. No. 4,189,508) or a combination of a plurality of DC magnets or permanent magnets and AC magnets (Japanese Patent Kokai No. 62-24430) have been proposed.

The aforementioned prior techniques have not been designed to provide a satisfactorily high ratio of reproducing output signal to noise (S/N) and have disadvantages that they are incapable of producing a magnetic recording medium having a high output and a high ratio of S/N. An explanation about one of the causes of this problem may be as follows. In order to enhance the reproducing output of the magnetic recording medium, an increase of residual flux density is generally required and for this purpose one known method is to increase the thickness of magnetic coating film. On the other hand, it is known that if the film thickness is increased, the properties at higher frequencies become poor.

In order to maintain better properties at higher frequencies, therefore, an attempt has been made to orient magnetic particles in a magnetic field so that the ratio of S/N is increased with the film thickness being kept thin. However, this conventional technique could not achieve a desired reduction of noise (N), though the output (S) was increased. This is attributed to occurrence of the coagulation of magnetic particles.

Therefore, there has been a problem that the prior art is unable to produce a magnetic recording medium having a high output and a high S/N ratio.

SUMMARY OF THE INVENTION

The present invention provides a method for magnetic orientation and a system therefor to produce a magnetic recording medium having a high output and a high S/N ratio as well as provides such a magnetic recording medium.

The present invention also provides a method for magnetic orientation of a magnetic recording medium by applying a magnetic flux to a magnetic coating film containing magnetic particles while said magnetic particles are still in a mobile state, said magnetic flux having a magnetic component in the longitudinal direction of said film, characterized in that said magnetic flux is oriented due to Meissner effect.

The present invention further provides a method for magnetic orientation of a magnetic recording medium as above where the strength of said magnetic flux fluctuates with time.

The present invention further yet provides a method for magnetic orientation of a recording medium comprising the steps of disposing a magnetic recording medium in a space where a magnetic flux exists, said medium comprising a substrate having magnetic particles from a powdery or dispersed coating material applied thereon, i.e., having a magnetic coating film containing magnetic particles, while said magnetic particles are still in a mobile state, disposing a superconductor in such a manner as said magnetic flux being oriented in a direction substantially parallel to the plane of said substrate in the vicinity of said substrate of said magnetic recording medium, thereby orienting said magnetic particles under said magnetic flux. All the steps except the last one may be conducted in any order. For example, one can dispose the superconductor and then the magnetic recording medium in place, or vice versa. The term "space where a magnetic flux" is intended to include such that no magnetic flux exists when the magnetic recording medium is being disposed, but after disposed, a magnetic flux is generated therein. Thus, all the steps except the last one may be performed in any convenient order.

The present invention also provides a method for magnetic orientation of a magnetic recording medium comprising forming a magnetic coating film on a substrate by applying a magnetic coating dispersion of magnetic particles in a high molecular weight binder, applying a magnetic flux to said magnetic coating film on said substrate, and disposing a superconductor in such a manner as said magnetic flux being oriented in a direction substantially parallel to the plane of said substrate in the vicinity of said substrate, thereby orienting said magnetic particles under said magnetic flux.

The present invention furthermore provides a system for magnetic orientation comprising a means of generating magnetic flux, at least one superconductor and a means of supporting a magnetic recording medium, and generating a magnetic flux having a recording magnetic component in the longitudinal direction of said magnetic recording medium owing to the Meissner effect between said superconductor and said magnetic flux generated by said magnetic flux generating means.

The present invention also provides a system for magnetic orientation comprising a means of generating magnetic flux, at least one superconductor disposed so as to align the magnetic flux generated by said magnetic generating means in a direction substantially parallel to the desired plane, and a means of supporting a magnetic recording medium substantially parallel to said plane.

In any method of the present invention as described above, the magnetic flux may be applied as the magnetic flux is fluctuated. That is, in case permanent magnets are employed, they may be vibrated, rotated or fluctuated in their positions. Alternatively, in case electromagnets are employed, AC (generating alternating magnetic field) or a pulse modulation may be applied. Of course, it is also possible that no fluctuation be caused in the magnetic flux to be applied. That is, permanent magnets or DC electromagnets may be used without any movement. Moreover, superimposing an AC (fluctuation) or a pulse and a DC as bias current, there may be generated a pulsing or fluctuating flux. Furthermore, the direction of the magnetic flux is somewhat inclined to produce a gradient of magnetic flux.

As is well known, superconductors exhibit Meissner effect. That is, the inside of superconductor prevents ingress of magnetic flux except a superficial portion of about $10^{-6}$ cm in thickness. The present invention allows a magnetic recording medium having an excellent magnetic orientation and a high S/N ratio to be produced by using the interaction between the Meissner effect and the magnetic fluxes passing in varying directions generated by magnets or coils.

By way of illustration, in an embodiment, if a magnet and a superconductor are placed facing to each other, the magnetic flux from the magnet is aligned approximately parallel to a certain plane between the magnet and the superconductor due to the interaction with Meissner effect. If a magnetic recording medium is disposed parallel to the plane in the vicinity thereof, therefore, a magnetic recording medium having an excellent magnetic orientation and a high S/N ratio can be produced by orienting the magnetic particles in the magnetic recording medium in the magnetic flux.

DETAILED DESCRIPTION

Embodiments of the systems of the present invention are now described with reference to the drawings.

Figure 1:
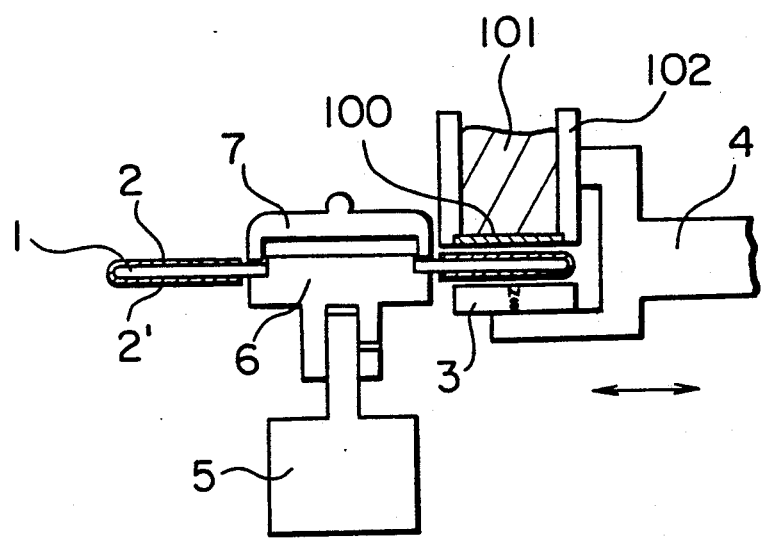
FIG. 1 is a diagrammatical cross-sectional view of an embodiment of the magnetic orientation systems within the principle of the present invention.

FIG. 1 is a diagrammatical cross-sectional view of an embodiment of the magnetic orientation systems within the principle of the present invention. A magnetic recording medium comprising substrate 1 having magnetic coating films 2 and 2' is supported on receiving plate 6 fixed on motor 5. 7 is lid for fixing the magnetic receiving medium. Arm 4 supports magnet 3 and container 102 containing coolant 101 (liquid nitrogen $N_2$) for cooling superconductor 100. The magnetic recording medium is inserted between magnet 3 and superconductor 100 with their surfaces being parallel to one another and then rotated to orient the magnetic particles in the magnetic coating film. At this time, the magnetic flux from magnet 3 (not shown) is subjected to the Meissner effect with superconductor 100 to provide the deflected magnetic flux (not shown), in which magnetic particles are oriented, while they are still in a mobile state.

Figure 3:
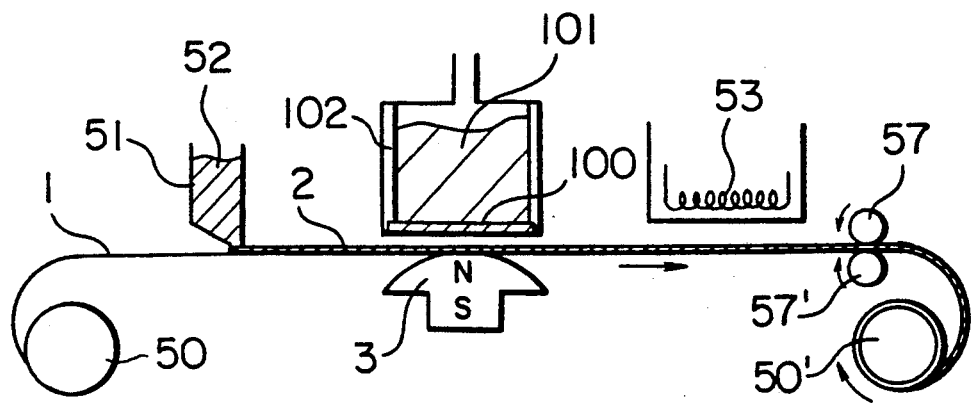
FIG. 3 is a diagrammatical cross-sectional view of an embodiment of the magnetic orientation systems within the principle of the present invention.
Figure 4:
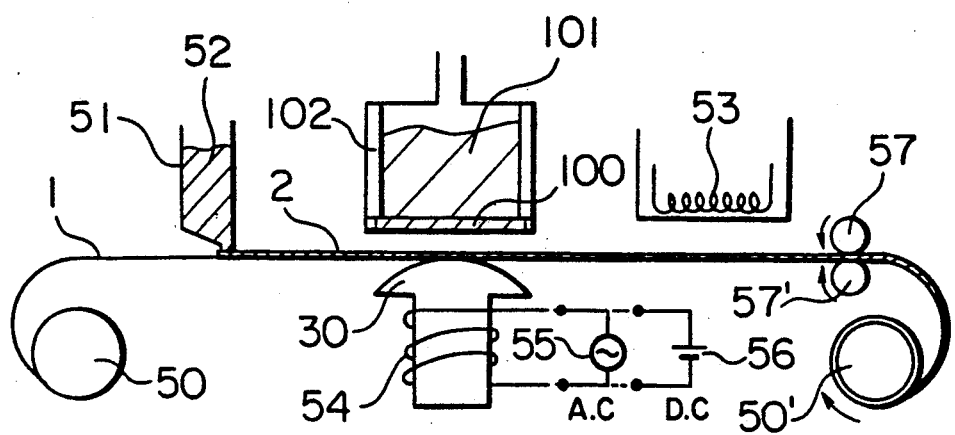
FIG. 4 is a diagrammatical cross-sectional view of another embodiment of the magnetic orientation systems within the principle of the present invention.

FIG. 3 and FIG. 4 are diagrammatical cross-sectional views of embodiments of magnetic orientation systems when magnetic tapes are employed as magnetic recording mediums. Substrate 1 of a polyester film is supplied from roll 50. Thermoplastic magnetic coating material having magnetic particles dispersed therein 52 is applied from tank 51 onto substrate 1 to produce magnetic coating film 2. Substrate 1 is driven by winding roller 50' and undried magnetic coating film 2 passes through the gap between the superconductor 100 and magnet 3 or magnetic core 30 at a constant velocity, during which the magnetic particles are oriented. Then magnetic coating film 2 is dried by heater 53. Again, superconductor 100 is engaged in the bottom of polytetrafluoroethylene container 102 as illustrated in the system shown in FIG. 1. In the system shown in FIG. 3, a permanent magnet is used as magnet 3, while in FIG. 4, electromagnet 54 is used. In the latter case, the electromagnet may be connected to alternating (fluctuating) power source 55a and direct current source 56 to superpose both currents therefrom, whereby a pulsing current and the like may be applied. Therefore, the intensity of magnetic flux may be fluctuated.

In the systems shown in FIGS. 3 and 4, permanent magnet 3 and magnetic core 30 have a convex configuration opposing the tape. When DC voltage 56 is applied in the systems of FIGS. 3 and 4, therefore, the magnetic fluxes from magnets 3 and 54 have a maximum, which has an influence on the intensity of the magnetic flux resulting from the interaction with superconductor 100. As a result, the orientation of the mobile magnetic particles becomes uniform and the surface roughness of the magnetic coating film is reduced.

When AC voltage 55 alone or in superposition with DC voltage 56 is applied in the system of FIG. 4, the magnetic flux generated from electromagnet 54 has a maximum as well as a minimum. In this case, the movement of the mobile magnetic particles is greater than in the previous case so that the surface roughness is also further reduced.

Figure 5:
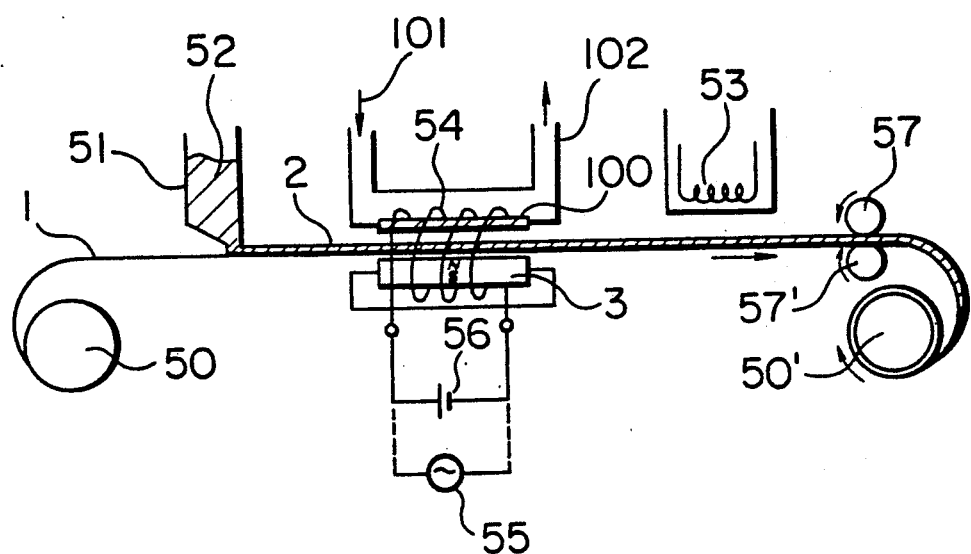
FIG. 5 is a diagrammatical cross-sectional view of still another embodiment of the magnetic orientation systems within the principle of the present invention.

FIG. 5 is a diagrammatical cross-sectional view of still another embodiment of magnetic orientation systems for magnetic tapes. A portion of the upper inside wall of a glass vessel of a double hollow tube type is removed and plane superconductor 100 is adhered to that portion with an epoxy resin adhesive. Plane magnet 3 is adhered to the opening provided in the lower inside wall facing that portion in the similar procedure. Coil 54 is provided surrounding superconductor 100 and magnet 3. Thus, the magnetic field of coil 54 interacts with superconductor 100 and the magnetic particles in magnetic coating film 2 affect each other to achieve an excellent orientation.

In this embodiment, permanent magnet 3 acting as a bias and electromagnet 54 acting as a varying component are employed. The function of permanent magnet 3 is the same as permanent magnet 3 in the systems shown FIGS. 1 and 3, to produce a magnetic flux. Moreover, the interaction of the magnetic flux from electromagnet 54 with Meissner effect due to superconductor 100 results in the deflected magnetic flux. By superposing a varying component on a bias as in this embodiment, revolution of magnetic particles is smoothly realized to effectively achieve the orientation.

Figure 6:
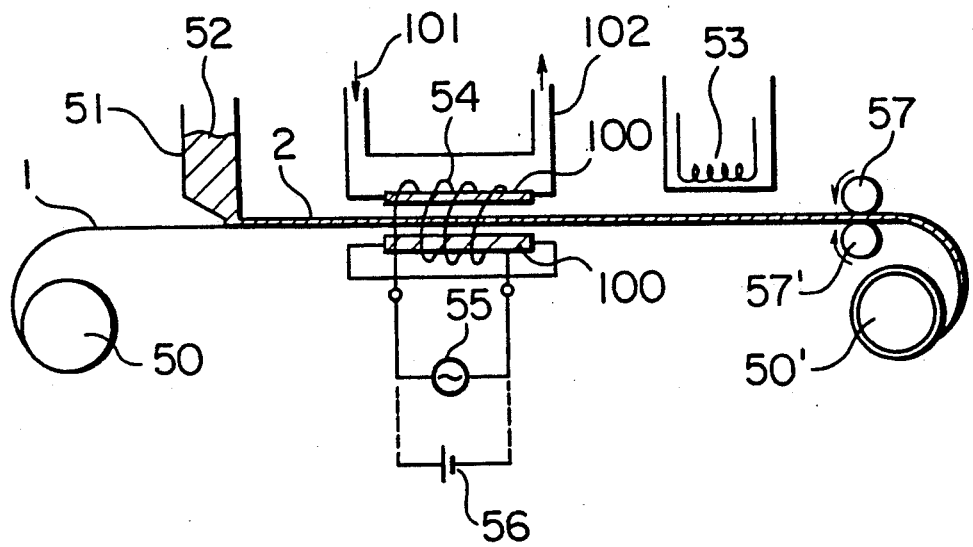
FIG. 6 is a diagrammatical cross-sectional view of still another embodiment of the magnetic orientation systems within the principle of the present invention.

FIG. 6 is a diagrammatical cross-sectional view of still another embodiment of magnetic orientation systems for magnetic tapes. This embodiment does not have permanent magnet 3 as in the system shown in FIG. 5, but electromagnet 55 having cylindrical superconductor 100 as a magnetic core. Electromagnet 54 is applied with an alternating current, a direct current, or a pulse of superposition of AC and DC. The magnetic flux generated from electromagnet 54 is influenced by the Meissner effect due to cylindrical superconductor 100. The resulting magnetic flux orients the magnetic recording medium disposed in cylindrical superconductor 100.

An example of the production of the superconductor used in the system as above will be explained next. Starting materials, $Y_2O_3$, $BaCO_3$, CuO were weighted in a ratio of Y:Ba:Cu of 1:2:3, wet-milled on a synthetic resin ball mill in the presence of methanol, and then dried at 100° C. for 12 hours to produce a powdery mixture. To 100 parts by weight were added 3 parts by weight of polyvinylalcohol as an organic binder and the mixture was pressed under a pressure of 1,000 $kgf/cm^2$ to a shape of 30 mm diameter x 2 mm thick. The shape was sintered at 950° C. for 10 hours in an oxygen atmosphere. Then, the sintered shape was crushed with an agate mortar and a pestle and wet-milled with a zirconia ball mill for 24 hours to produce superconductor particles having an average size of 2.0 $\mu m$.

To 100 parts by weight of these superconductor particles were added 8 parts by weight, 4 parts by weight of phthalic ester as plasticizer, 20 by weight of butanol as solvent, 40 parts by weight of trichloroethylene and the mixture was homogenized by mixing in a ball mill for 50 hours to produce a ceramic slip (slurry) which was cast by a tape-casting process (with a doctor blade) to obtain a green sheet having a thickness of 0.8 to 1.2 mm.

After the green sheet was cut into segments having a size of 50 mm, the segments were sintered at 950° C. for 10 hours in an oxygen atmosphere to obtain the superconductors used in the system shown in each of FIGS. 1, 3 and 4. Those to be used in other systems were similarly produced except that the green sheet was cut in different sizes and shapes.

The following examples illustrate the production of magnetic recording mediums using the aforementioned systems.

EXAMPLE 1

Figure 2:
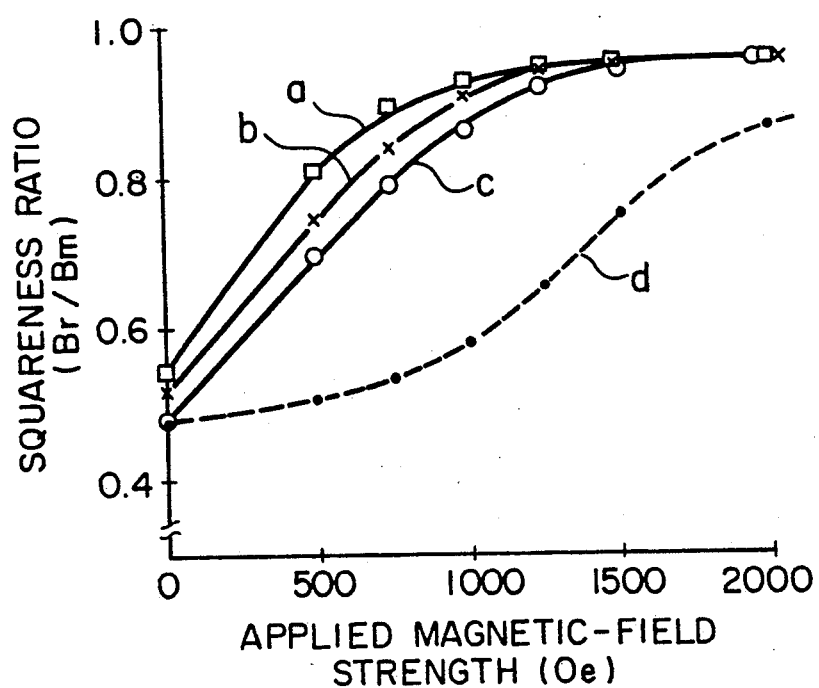
FIG. 2 is a graph showing the relationship between the squareness ratio and the applied magnetic field strength for explanation of the present invention.

300 g of acicular Co-$\gamma$-$Fe_2O_3$ (an average size of 0.33×0.05 $\mu m$, coercive force Hc of 650 Oe), 300 g of a binder mixture consisting of predominantly epoxy resin and phenol resin and 850 g of a solvent mixture consisting of cyclohexanone and toluene were mixed in a ball mill to produce a magnetic coating dispersion. This coating dispersion was further conditioned with isophorone to a viscosity of 95 cp and applied to an aluminum substrate of 5 inches while rotating at 2,200 rpm for 20 seconds so as to form a magnetic coating film having a central portion of about 0.55 $\mu m$ in thickness as dried film. While the magnetic coating films were still undried, they were used in the system shown in FIG. 1 to perform the magnetic orientation. These superconductors exhibit a critical temperature of 80° K. or higher, superconductive state at a temperature of liquid nitrogen of 77° K. and Meissner effect. When the orientation was effected, the substrate was rotated at a speed of 60 rpm and the distance between the magnetic coating film and the superconductor was kept about 2 mm. A plurality of samples were oriented for 10 seconds with varying magnetic fields being applied. Thereafter, the magnetic coating films were hardened at 210° C. for 2 hours. After processing, a fluorinated liquid lubricant was applied to the films to produce magnetic disks. These magnetic disks had a squareness ratio, Br/Bm in the longitudinal direction thereof as shown in FIG. 2, curve a. The squareness ratio of the magnetic disks produced according to the prior magnetic orientation technique using no superconductor is shown by a curve d in the same FIGURE. The curve a indicates that the squareness ratio (Br/Bm) tends to be saturated at a low magnetic field (750 Oe) and has a maximum of 0.95 which is significantly larger than that of the prior art and near the possible upper limit. That is, the output (S) is extremely higher as compared with the prior art.

Moreover, the transmission electron microscopic photographs (TEM) and the scanning electron microscopic photographs (SEM) indicated that the magnetic particles were not coagulated, but uniformly dispersed. Noise level (N) was also reduced as compared with the prior art. The S/N ratio of the magnetic disks according to the present invention was enhanced 13 to 27% relative to that of the prior magnetic disks.

EXAMPLE 2

25 g of an epoxy resin having a size of 8.0 $\mu m$, 100 g of powdery ferromagnetic substance (powdery Co-coated iron oxides having a BET specific surface area of 40 $m^2/g$ and Hc of 770 Oe) and 5 g of single crystal alumina were intimately mixed. Then, to the mixture were 10 g of cyclohexanone were added and the mixture was further mixed on a kneader. Thereafter, 5 g of further cyclohexanone were added and the mixture was kneaded for 4 hours under high shearing force.

The thus kneaded material was placed in the pot of a ball mill, 140 g of a solvent mixture consisting of cyclohexanone and isophorone were added thereto, and the whole was kneaded for 3 days in the ball mill to disperse ferromagnetic particles. Then, to the dispersion was added a solution of 25 g of phenolic resin and 6 g of vinyl resin dissolved in 490 g of a solvent mixture consisting of cyclohexanone and isophorone to produce a coating dispersion for magnetic disks. The coating dispersion was applied to an aluminum substrate of 5.25 inches, the surfaces have been previously cleaned, while the substrate was rotated. The coating film on the substrate was longitudinally oriented under the magnetic field by means of the system shown in FIG. 1. The magnetic coating film was hardened at 210° C. and determined for the film thickness and the surface roughness.

The resulting magnetic disk had a film thickness of 0.46 $\mu m$ at R 38 mm and 0.48 $\mu m$ at R 60 mm before processing. Moreover, the surface roughness was 0.020 $\mu m$ Ra before processing. Thereafter, the coating film was processed to obtain film thicknesses of 0.30 $\mu m$ at both R 38 mm and R 60 mm.

The disk was measured with a metal-in-gap type head having a gap length of 0.3 $\mu m$ for electrical properties. The measuring was conducted under the condition that the maximum recording frequency was 26, 25 KFCI and the minimum recording frequency was 6.56 KFCI. The result was similar to that of Example 1 and the relationship as shown in FIG. 2, curve b was obtained.

EXAMPLE 3

70 g of polyvinylbutyral powder and 700 g of plate hexagonal barium ferrite magnetic particles (diameter: about 0.1 $\mu m$, Hc:655 Oe) were charged in the kneader and mixed for about 15 minutes. Then, 250 g of Cellosolve acetate were gradually added and kneaded for further 4 hours. 480 g of this kneaded material were placed in the 3 l pot of the ball mill with 12 g of alumina and 700 g of Cellosolve acetate and kneaded in the ball mill for 7 days to disperse well the magnetic particles and the alumina. Then, 120 g of phenolic resin, 300 g of a solution of 40% epoxy resin in Butylcellosolve and 500 g of Butylcellosolve were added and mixed to prepare a coating dispersion for magnetic disks. The coating dispersion was applied to the surfaces of aluminum disks which had been previously cleaned by the same process as in Example 1 to produce longitudinally oriented magnetic disks. The, squareness ratio property of the disks is shown in FIG. 2, curve c. Moreover, TEM and SEM of the magnetic coating film indicated that the plate hexagonal barium ferrite magnetic particles were not coagulated, but uniformly dispersed, and their magnetization-easy axis was oriented to the longitudianl direction.

Accordingly, the present invention can make a longitudinally oriented magnetic recording medium with the plate hexagonal barium ferrite magnetic particles satisfying the standard value of squareness ratio ($Br/Bm \geq 0.8$).

EXAMPLE 4

98 parts of acicular $Co-\gamma-Fe_2O_3$ (an average size of $0.33 \times 0.05$ μm, coercive force Hc of 650 Oe), 5 parts of alumina, 15 parts of polyurethane, 12 parts of vinyl chloride/vinyl acetate copolymer, 3 parts of silicone resin, 2 parts of lecithin, 0.2 parts of lead stearate, 120 parts of cyclohexanone, 80 parts of methyl isobutyl ketone, 15 parts of ethylene glycol and 90 parts of toluene were mixed in the ball mill to produce a magnetic coating dispersion. The magnetic coating dispersion was applied to a polyethylene terephthalate to form a coating thickness of 3 μm. While the magnetic coating was undried, the film was passed through the magnetic orientation system, then the coating was dried and subjected to the conventional calendering process to produce a magnetic tape. The magnetic orientation was effected (using magnets and coils) with the strength of magnetic field of about 1,500 Oe being applied to the magnetic coating in a longitudinal direction.

In the case as shown in FIG. 3, the tape was processed at a tape speed of 100 cm/min. (in the direction of the arrow) and heat-treated at 70±10° C.

Similarly, in the case as shown in FIG. 4, the tape was processed at a tape speed of 300 cm/min. and heat-treated at 70±10° C. The magnetic orientation was effected under an average strength of magnetic field of 1,500 Oe (DC component is 1,500 Oe, AC component is ±250 Oe), i.e., a pulsing magnetic field of 1,250 to 1,750 Oe by applying a pulsing current from superposition of a direct current (DC) of 10 V, 5 A and an alternating current (AC) of 10 V, 2 A to the coil. Since the Meissner effect led to a further variation of ±300 Oe, however, the alternating magnetic field varied from 950 to 2,050 Oe.

Similarly, in the case as shown in FIG. 5, the tape was processed at a tape speed of 500 cm/min. and heat-treated at 70±10° C. The magnetic orientation was effected by applying to the magnetic film a varying magnetic field which consists of the superposition of a bias magnetic field, i.e., a vertical magnetic component of 1,500 Oe given by the permanent magnet 3 and a magnetic field in the longitudinal direction of 1,500 Oe (DC component is 1,500 Oe, AC component is ±250 Oe), i.e., a pulsing magnetic field of 1,250 to 1,750 Oe generated by the coil and which was further varied ±350 Oe by the Meissner effect.

Similarly, in the case as shown in FIG. 6, the tape was processed at a tape speed of 500 cm/min. and heat-treated at 70±10° C. The magnetic orientation was effected under a varying magnetic field of 1,500 Oe generated by applying a direct current (DC) of 12 V, 7 A superimposed with an alternating current (AC) of 12 V, 5 A, and 10 Hz to 500 Hz, preferably 100 Hz, the frequency range of which had been found effective for a reduction of magnetic medium noise (N), to the coil which was wound around the cylindrical superconductor and could be elongated to hide the superconductor. In all cases, the tape was treated under the magnetic field which was further varied ±250 Oe at the maximum and minimum of frequency due to the Meissner effect, especially at the ends of the cylindrical superconductor.

The same effects could be obtained even with pulsing currents as well as with the alternating currents used here. Moreover, the measurements were performed at a temperature of +20° C. to −20° C.

All the magnetic tapes produced by means of any one of the systems according to the present invention has a S/N ratio enhanced 11% to 17% relative to that of the conventional ones.

There could be produced the magnetic recording mediums having a high output and an excellent S/N ratio according to the present invention.

What is claimed is:

1. A method for magnetic orientation of a magnetic recording medium by disposing a magnetic coating film containing magnetic particles between a magnet and an oxide superconductor having an operating temperature of 77° K., while said magnetic particles are still in a mobile state, and applying a magnetic flux having a magnetic component in the longitudinal direction of the magnetic coating film, wherein said magnetic flux is oriented due to the Meissner effect.

2. The method for magnetic orientation of a magnetic recording medium according to claim 1, wherein the strength of said magnetic flux fluctuates with time.

3. A method for magnetic orientation of a magnetic recording medium, comprising the steps of disposing the magnetic recording medium in a space between a magnet and an oxide superconductor having an operating temperature of 77° K. where a magnetic flux exists, said medium comprising a substrate having magnetic particles from a powdery or dispersed coating material applied thereon, said superconductor being positioned in such a manner that said magnetic flux is aligned in a direction substantially parallel to the plane of said substrate of said magnetic recording medium in the vicinity thereof, thereby orienting said magnetic particles in said magnetic flux.

4. A method for magnetic orientation of a magnetic recording medium comprising forming a magnetic coating film on a substrate by applying a magnetic coating dispersion of magnetic particles in a high molecular weight binder, disposing the magnetic coating film between a magnet and an oxide superconductor having an operating temperature of 77° K. and applying a magnetic flux to said magnetic coating film on said substrate to orient said magnetic particles, wherein said superconductor is disposed in such a manner that said magnetic flux is aligned in a direction substantially parallel to the plane of said substrate in the vicinity thereof, thereby orienting said magnetic particles under said magnetic flux.

5. The method for magnetic orientation of a magnetic recording medium according to claim 1, wherein said magnetic recording medium is a magnetic recording medium having a magnetic orientation parallel to the plane thereof and the magnetic coating film of said magnetic recording medium contains magnetic particles of plate hexagonal barium ferrite.

6. The method for magnetic orientation of a magnetic recording medium of claim 1 wherein the strength of said magnetic flux varies in a pulse state with respect to time.

* * * * *